US005171082A

United States Patent [19]

Watanabe

[11] Patent Number: 5,171,082

[45] Date of Patent: Dec. 15, 1992

[54] VEHICULAR HEADLAMP HAVING REFLECTOR FOR CONTROLLING LUMINOUS INTENSITY DISTRIBUTION PATTERN

[75] Inventor: Takao Watanabe, Shizuoka, Japan

[73] Assignee: Koito Manufacturing Co., Ltd., Tokyo, Japan

[21] Appl. No.: 824,774

[22] Filed: Jan. 23, 1992

[30] Foreign Application Priority Data

Jan. 28, 1991 [JP] Japan .................................. 3-25010

[51] Int. Cl.[5] .......................... B60Q 1/04; F21V 7/09

[52] U.S. Cl. ....................................... 362/61; 362/346

[58] Field of Search .................. 362/61, 346, 304, 215

[56] References Cited

U.S. PATENT DOCUMENTS

| | | | |
|---|---|---|---|
| 3,710,095 | 1/1973 | Donohue et al. | 362/348 |
| 4,456,948 | 6/1984 | Brun | 362/346 |
| 4,755,919 | 7/1988 | Lindae et al. | 362/304 |
| 4,779,179 | 10/1988 | Oyama et al. | 362/346 |
| 4,924,359 | 5/1990 | Lindae et al. | 362/61 |
| 4,972,307 | 11/1990 | Takatsuji et al. | 362/61 |
| 5,079,677 | 1/1992 | Kumagai | 362/61 |
| 5,086,376 | 2/1992 | Blusseau | 362/61 |

*Primary Examiner*—Ira S. Lazarus
*Assistant Examiner*—L. Heyman
*Attorney, Agent, or Firm*—Sughrue, Mion, Zinn, Macpeak & Seas

[57] ABSTRACT

A vehicular headlamp having a reflector with the capability for controlling the luminous intensity distribution so as to attain a balance between the spread of light in luminous intensity distribution in the horizontal direction and the brightness required in the central part of the distribution. The reflecting surface of the reflector is divided into a plurality of regions in accordance with the necessary action of controlling the luminous intensity distribution. Some of these regions are each formed as an assembly of hyperbolic paraboloidal reflecting elements that form a luminous intensity distribution pattern that is broadly diffused in the horizontal direction, others of the reflecting regions are each formed as an assembly of elliptic paraboloidal reflecting elements that chiefly contribute to the formation of the central area of the luminous intensity distribution pattern, while still another reflecting region is formed as an assembly of bilobate hyperboloidal reflecting elements and, depending on the position of the selected light source (high or low beam) the latter region contributes to the formation of the central area of the luminous intensity distribution pattern of the high beam while contributing to the formation of a cut line that is characteristic of the low beam and that is inclined to the horizontal line of the luminous intensity distribution pattern of the low beam.

7 Claims, 14 Drawing Sheets

VEHICULAR HEADLAMP HAVING REFLECTOR FOR CONTROLLING LUMINOUS INTENSITY DISTRIBUTION PATTERN

BACKGROUND OF THE INVENTION

The present invention relates to vehicular headlamp having a reflector for controlling the luminous intensity distribution from the headlamp, wherein the reflecting surface of the reflector is composed of a plurality of reflecting regions. Each reflecting region is formed as an assembly of many small reflecting elements that take one of three fundamental shapes, i.e., a hyperbolic paraboloid, an elliptic paraboloid and a bilobate hyperboloid, and which are fixed to a reference member to form the entirety of the reflecting surface. The novel reflector that is provided in accordance with the present invention is such that the outer lens, which is positioned ahead of the reflector, need not control the luminous intensity distribution of the headlamp, while nevertheless a desired luminous intensity distribution pattern can be formed while insuring that the requirements for diffusion in the horizontal direction and formation of the central part of the pattern can be satisfied.

Conventionally, for producing a low beam in an automotive headlamp, a coiled filament is positioned near the focal point of a reflector, which is in the form of a spheroid (paraboloid of revolution) in such a way that the central axis of the filament extends parallel to the optical axis of the reflector. (This filament arrangement is generally referred to as the "C8 type"). A shade is positioned below the filament for forming a cut line (cut-off) in the luminous intensity distribution pattern.

With this arrangement, part of the light issuing from the filament is blocked by the shade, so that generally the lower half of the reflecting surface does not receive much light, and hence is not used effectively. The luminous intensity distribution of the pattern image obtained with the reflector is controlled by means of diffusing and refractive lens steps formed in the outer lens, which is positioned ahead of the reflector. As a result, there is obtained a luminous intensity distribution pattern that provides the required beam spread in the horizontal direction. Thus, conventionally, control of luminous intensity distribution by the lens steps in the outer lens has played an important role in forming a luminous intensity distribution pattern that has the appropriate cut-line characteristic of the low beam.

One of the demands on the styling of modern automobiles is to streamline the car body in order to satisfy various aerodynamic and design requirements. Under these circumstances, it has become necessary to provide a headlamp that is adaptive to the body of a so-called "slant nose" type car whose front narrows gradually. However, this has made it necessary to reduce the height of the headlamp while increasing the angle (i.e., the slant angle) the outer lens forms with the vertical axis. As a result, the height of the reflector must be decreased and, furthermore, the inclination of the outer lens made very sharp. This has led to the problem that the lens steps in the outer lens cannot properly control the luminous intensity distribution, as compared with earlier designs. This is because, with a greater inclination of the outer lens, disadvantages occur such as light attenuation by the lens and drooping of the luminous intensity distribution pattern in areas close to both the right and left ends. (This phenomenon is generally referred to as "optical drooping").

With a view to solving this problem, an increasing effort has been made to fulfill the function of controlling the luminous intensity distribution with the reflector rather than the outer lens. To this end, various techniques have been employed such as providing a reflecting surface that consists of a plurality of reflecting regions having variable focal lengths, as well as offsetting the normal axes of the respective regions. However, it has been difficult to both simultaneously provide high diffusibility in the horizontal direction and insure adequate brightness in the central area in the formation of a luminous intensity distribution pattern.

SUMMARY OF THE INVENTION

The present invention has been accomplished under these circumstances, and an object of the invention is to obviate the aforementioned problems of the prior art.

In accordance with the invention, each of the reflecting regions which constitute the reflecting surface is formed as an assembly of many small reflecting elements, and the reflecting elements have one of three basic shapes, i.e., a hyperbolic paraboloid, an elliptic paraboloid and a bilobate hyperboloid. The reflecting elements are fixed to a reference member for each reflecting region, thereby forming the entire reflecting surface.

According to the present invention, luminous intensity distribution patterns produced by the reflecting regions composed of the hyperbolic paraboloidal reflecting elements have a wide diffusibility in the horizontal direction, whereas luminous intensity distribution patterns produced by the reflecting regions composed of the elliptical paraboloidal reflecting elements do not have as much diffusibility but instead contribute primarily to the formation of the central part of the overall luminous intensity distribution pattern. As a result, the two heretofore incompatible requirements, i.e., adequate diffusion in the horizontal direction of the luminous intensity distribution pattern and a specified brightness for the center of the luminous intensity distribution pattern, can be satisfied simultaneously by the control capability of the two types of reflecting regions. Furthermore, the reflecting region composed of the bilobate hyperboloidal reflecting elements makes a particular contribution to the formation of an inclined cut line as regards the luminous intensity distribution pattern of low beams.

BRIEF DESCRIPTION OF THE DRAWINGS

FIG. 4(*b*) is a side view of the same hyperbolic paraboloid;

FIG. 6(*b*) is a side view of the same elliptic paraboloid;

FIG. 8(*b*) is a side view of the same bilobate hyperboloid;

FIG. 9(*b*) is a diagram showing schematically how hyperbolic paraboloidal segments are arranged on the base member;

FIG. 9(*c*) is a diagram showing how bilobate hyperboloidal segments are arranged on the base member;

FIG. 11(*b*) is a diagram showing, also in the case of a high beam, the respective patterns obtained from regions 2(8), 2(9) and 2(10);

FIG. 13(*b*) is a diagram showing, also in the case of a low beam, the respective patterns as obtained from regions 2(2) and 2(4);

FIG. 14(*b*) is a diagram showing the general luminous intensity distribution pattern of the low beam.

DESCRIPTION OF THE PREFERRED EMBODIMENTS

Figure 1:
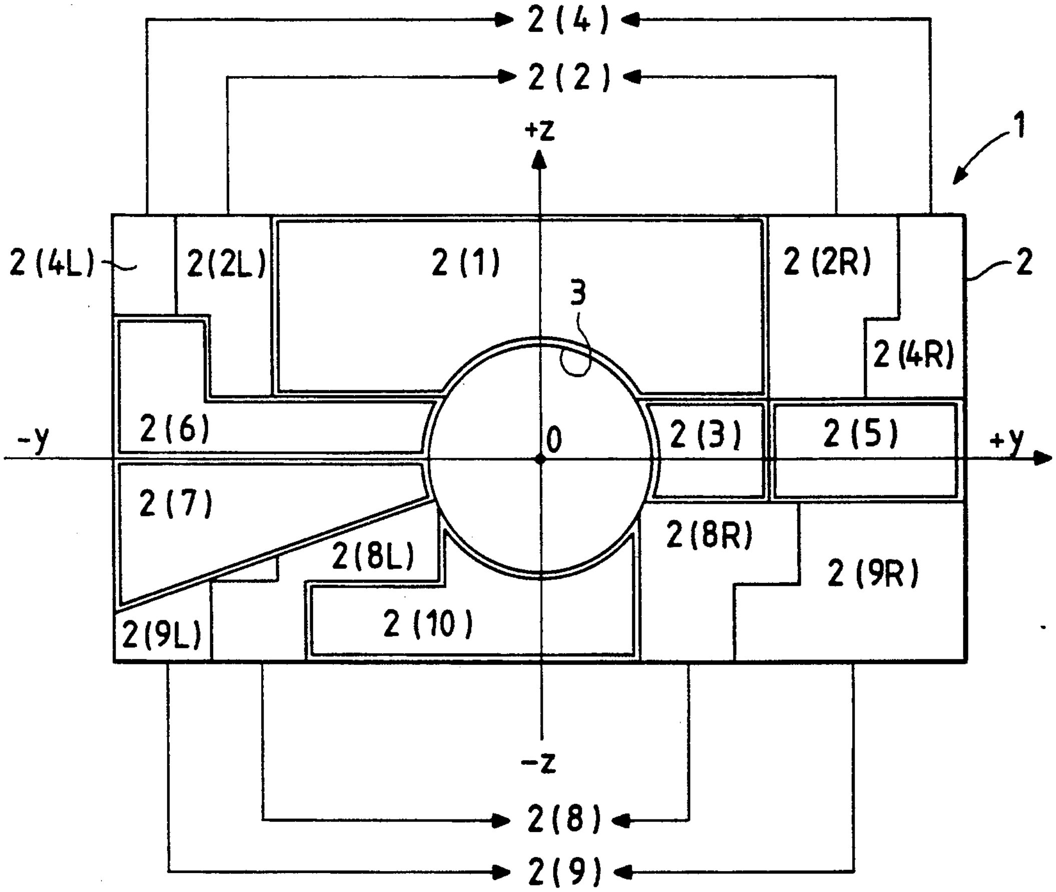
FIG. 1 is a front view showing schematically a reflector of the present invention, which is divided into a plurality of zones over which the luminous intensity distribution to be produced is controlled.

FIG. 1 shows diagrammatically a reflector 1 constructed according to the present invention. The reflector 1 is divided into a plurality of zones over which the luminous intensity distribution of the headlamp is controlled. The reflecting surface 2 of the reflector 1 is composed of a total of 10 reflecting regions (which are hereunder designated by 2(i), where is an index identifying individual regions). The coordinate system of the reflector 1 is such that the axis that passes through the center of the reflecting surface 2 and that extends in a direction perpendicular to the drawing surface is designated as the x-axis, whereas the axes that cross the x-axis at right angles are selected as y- and z-axes, the y-and z-axes extending in a horizontal and a vertical direction, respectively. Formed at the center of the reflecting surface 2 is a circular electric bulb mounting hole 3, which centers at the origin O of the rectangular coordinate system.

Figure 2:
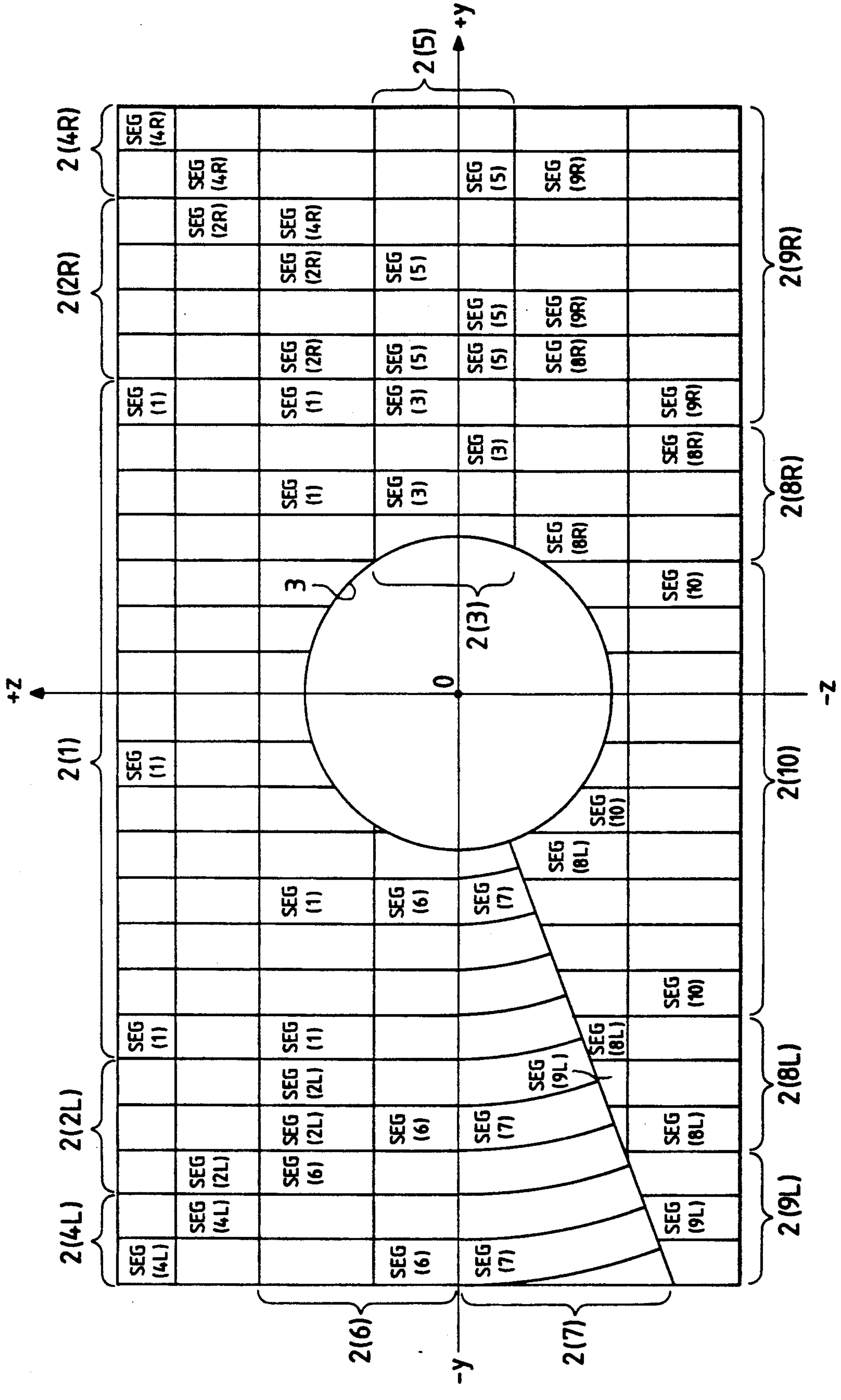
FIG. 2 is a front view of the reflector of FIG. 1.

As shown in FIG. 2, each of the regions 2(i) (i=1 to 10) is composed of a plurality of small zones (hereunder referred to as "segments"). These segments have different curved shapes (i.e., a hyperbolic paraboloid, an elliptic paraboloid and a bilobate hyperboloid) depending on the particular region 2(i). The whole of the reflecting surface 2 is formed by attaching these segments partially to a base member that has a spheroidal shape. Each of the segments that make up those reflecting regions which require a strong diffusing action in the horizontal direction in the luminous intensity distribution pattern has a convex surface as viewed from the front, whereas each of the segments that make up those reflecting regions which provide only a small diffusing action has a concave surface as viewed from the front.

The reflecting regions 2(1), 2(2) and 2(4) are in the upper half (z>0) of the reflecting surface and occupy the area closer to the top end. More specifically, region 2(1) which bridges the first quadrant (y>0, z>0) and the second quadrant (y<0, z>0) of the y-z plane occupies the center top of the upper half of the reflecting surface. Region 2(2) is composed of two partial regions that are located on opposite sides of the region 2(1). The partial region on the left side (y<0) is designated 2(2L) and the partial region on the right side (y>0) is designated 2(2R).

The region 2(1), as viewed from the front, has a contour that is in the form of a rectangle elongated in the horizontal direction, except for the area corresponding to the bulb mounting hole 3. The partial regions 2(2L) and 2(2R) are both L-shaped as viewed from the front, but they are not identical in shape being asymmetric with respect to one another.

Region 2(4) is located on the farther end of each of the partial regions 2(2L) and 2(2R). The region 2(4) on the left side is designated partial region 2(4L) and the region 2(4) on the right side is designated partial region 2(4R). Partial region 2(4L) is in a rectangular form as viewed from the front, whereas partial region 2(4R) has an L shape that matches the partial region 2(2R).

The middle part of the reflecting surface is composed of the leftmost region 2(6), region 2(7) lying just beneath region 2(6), and region 2(3) to the right and adjacent region 2(5) on the rightmost side. Region 2(6), which is L-shaped, is located in the second quadrant of the y-z plane and occupies an area closer to the y-axis, and region 2(7), which is located just o beneath region 2(6), belongs to the third quadrant of the y-z plane. Regions 2(6) and 2(7) are bounded by a cross section taken on the x-y plane. As will be described below, region 2(7) contributes to the formation of a cut line that is inclined at a predetermined angle with respect to a horizontal line.

Region 2(3) is located just to the right of the bulb mounting hole 3 and bridges the first quadrant and the fourth quadrant (z<0, y>0) of the y-z plane. Located farther to the right is region 2(5), which lies just beneath the partial regions 2(2R) and 2(4R) and bridges the first and fourth quadrants of the y-z plane.

The area closer to the bottom end of the reflecting surface is occupied by regions 2(8), 2(9) and 2(10). As shown, region 2(10) bridges the third and fourth quadrants of the y-z plane (more of that region is located in the third quadrant), and region 2(8) is situated on both sides of region 2(10). The region 2(8) on the left side is in the third quadrant and is designated left partial region 2(8L), whereas the region 2(8) on the right side is in the fourth quadrant and is designated right partial region 2(8R).

Region 2(9) is located on the farther end of each of the partial regions 2(8L) and 2(8R). The region 2(9) on the left side is designated partial region 2(9L) and belongs to the third quadrant of the y-z plane. As viewed from the front, partial region 2(9L) is in the form of a trapezoid lying on one side. The region 2(9) on the right side is designated partial region 2(9R) and belongs to the fourth quadrant of the y-z plane. Partial region 2(9R) is L-shaped.

The region 2(7) and each of the regions 2(8L) and 2(9L) are bounded by a curved cross section of the reflecting surface 2 obtained by cutting the reflecting surface 2 along a plane that includes the x-axis and forms a predetermined angle (corresponding to the cut line angle) with the x-y plane. On the other hand, the regions 2(3) and 2(5) are bounded from the regions 2(8R) and 2(9R) by a curved cross section of the reflecting surface 2 as obtained by cutting the reflecting surface 2 through a plane that is parallel to the x-y plane at a point where z is constant (<0).

Each of the regions 2(j) (i =1, 2L, 2R, 3, 4L, 4R, 5, 6, 7, 8L, 8R, 9L, 9R and 10) is composed of segments which are designated by SEG(j), where j is an index that identifies the same region as index i. As already mentioned, these segments differ from region to region. First, each of the segments composing regions 2(1), 2(2), 2(3), 2(9) and 2(10) is in the form of a hyperbolic paraboloid and, as viewed from the front, these segments form a grid pattern.

Figure 3:
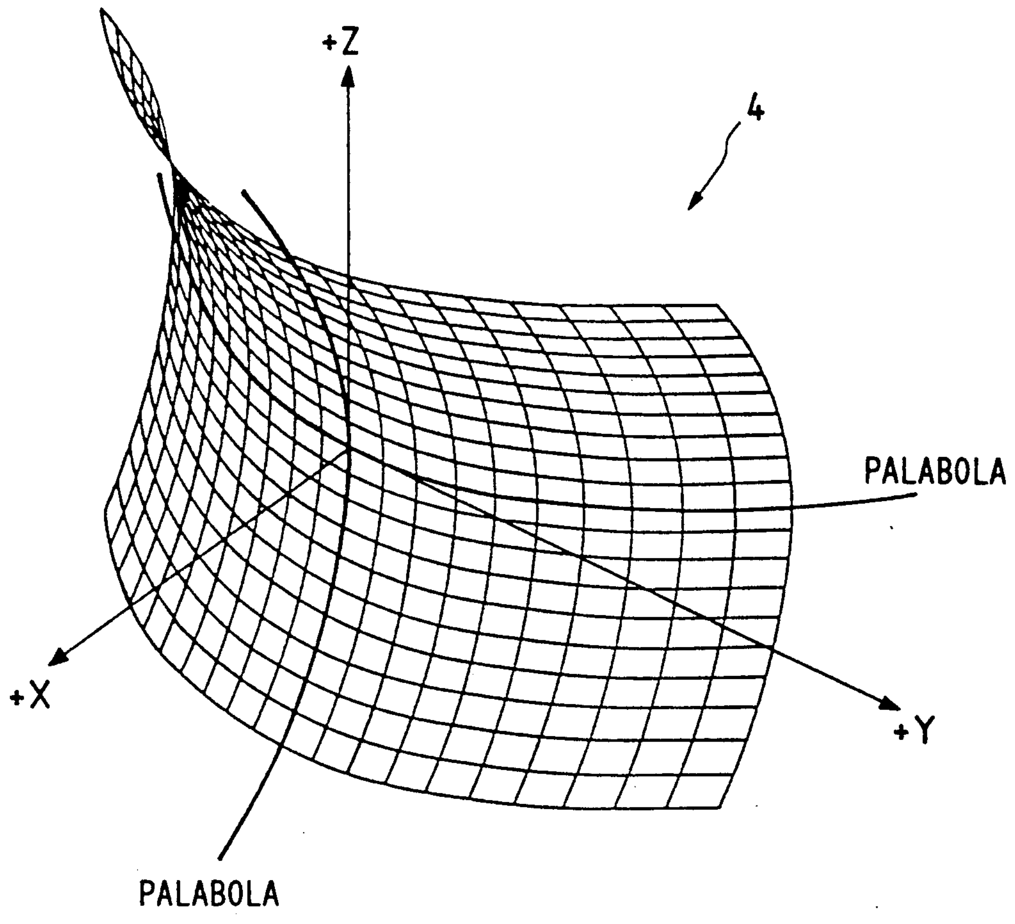
FIG. 3 is a perspective view showing the shape of a hyperbolic paraboloid.
Figure 4A:
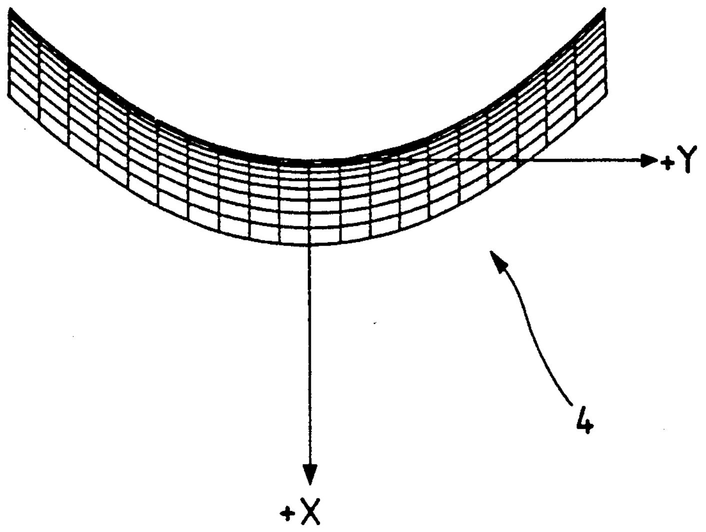
FIG. 4(*a*) is a plan view of the same hyperbolic paraboloid.
Figure 4B:
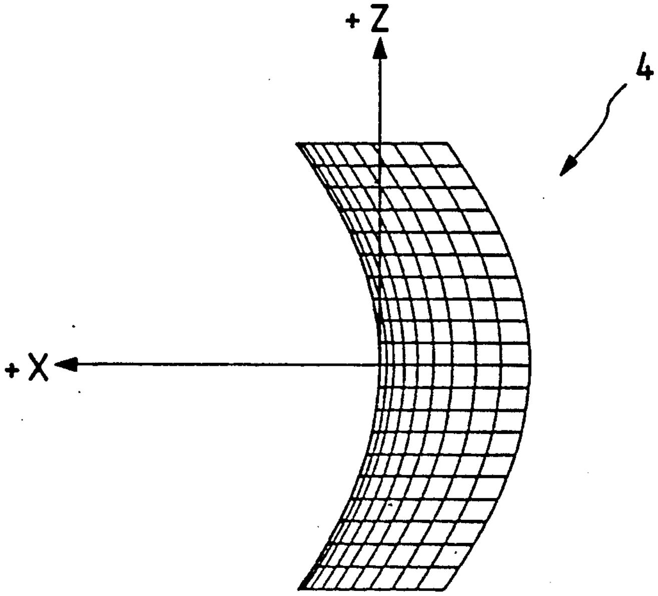

FIGS. 3 and 4 show the shape of a hyperbolic paraboloid 4 forming the basic geometry of segments. The coordinate system of this hyperbolic paraboloid is such that the axis extending normal to the origin is selected as the x-axis, whereas &hose axes which extend in the horizontal and vertical directions are selected as the y- and z-axes, respectively. The hyperbolic paraboloid 4 is parabolic in both a horizontal and a vertical section; however, the parabola in the horizontal section is convex in the positive direction of the x-axis, whereas the parabola in the vertical section is concave in the positive direction of the x-axis. Therefore, the hyperbolic paraboloid 4 provides a positive diffusing action in the horizontal direction.

Figure 5:
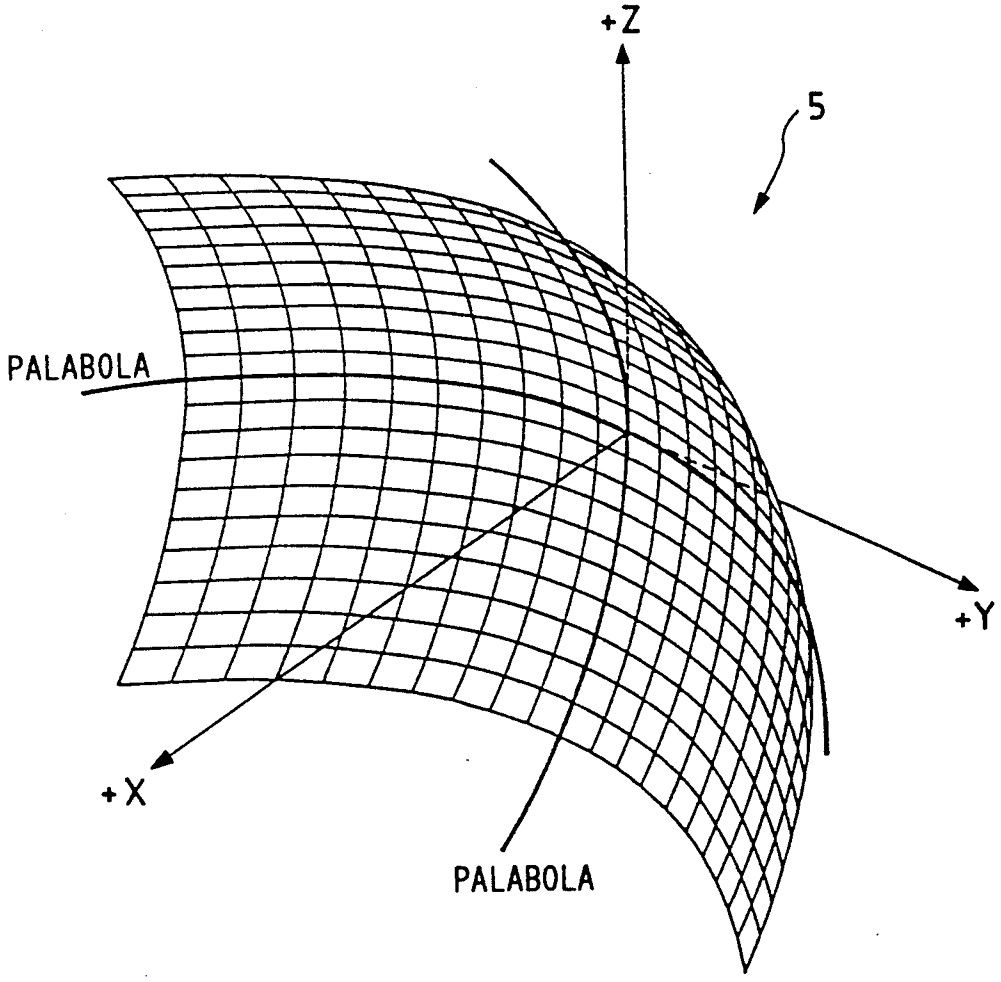
FIG. 5 is a perspective view showing the shape of an elliptic paraboloid.
Figure 6A:
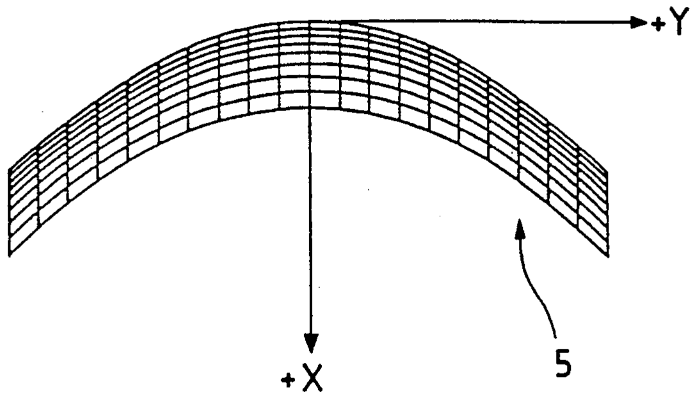
FIG. 6(*a*) is a plan view of the same elliptic paraboloid.
Figure 6B:
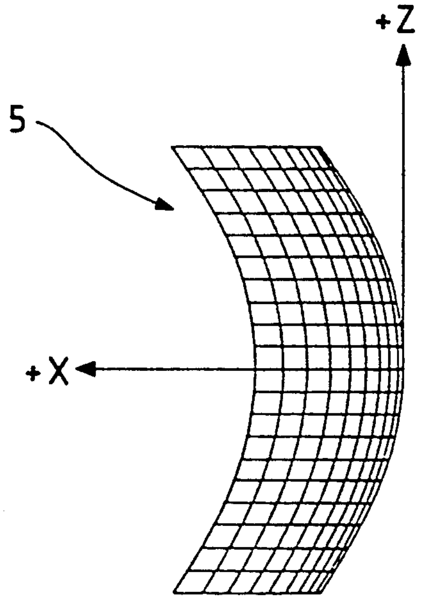

Each of the segments composing regions 2(4), 2(5), 2(6) and 2(8) is in the form of an elliptic paraboloid. FIGS. 5 and 6 show the shape of an elliptic paraboloid 5 as parabolic in both a horizontal and a vertical section. In this case, each of the parabolas in the horizontal and vertical sections is concave in the positive direction of the x-axis, so that the elliptic paraboloid 5 provides a weaker diffusing action in the horizontal direction than does the hyperbolic paraboloid 4.

Figure 7:
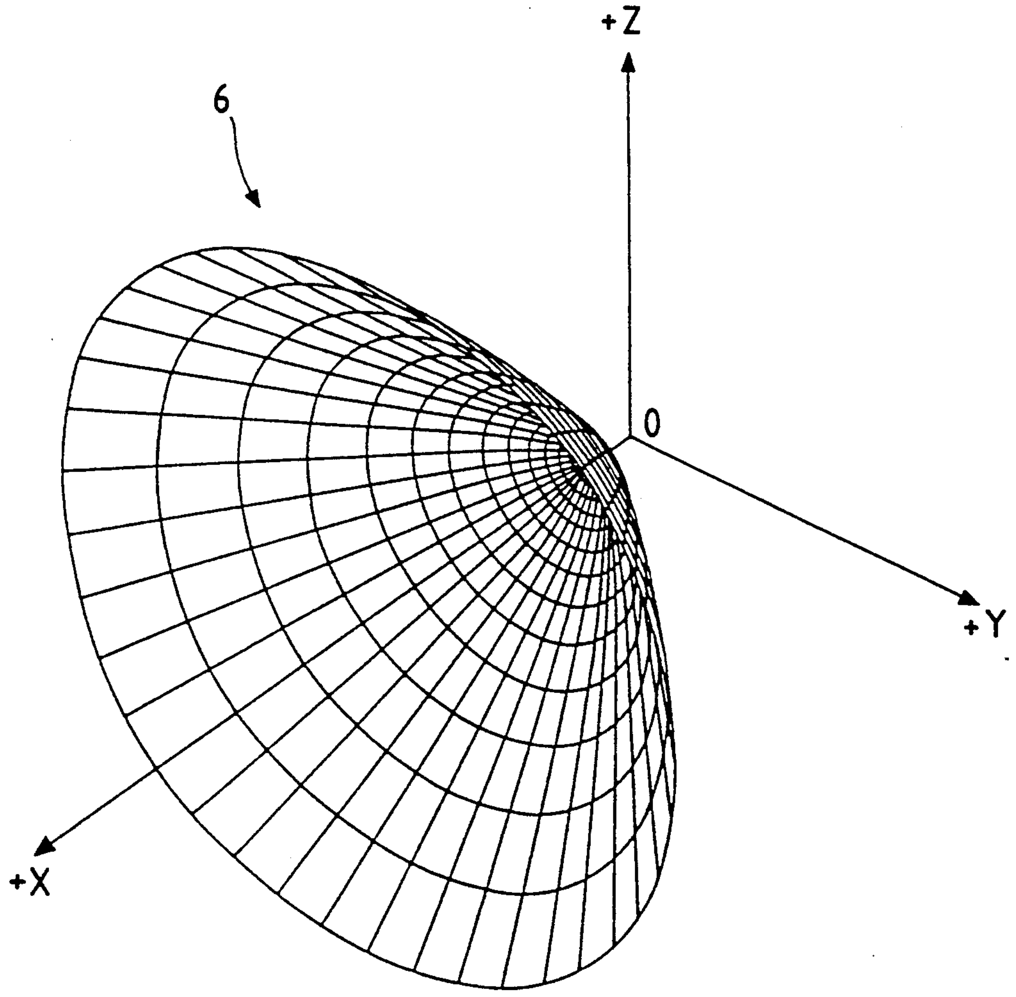
FIG. 7 is a perspective view showing the shape of a bilobate hyperboloid.
Figure 8A:
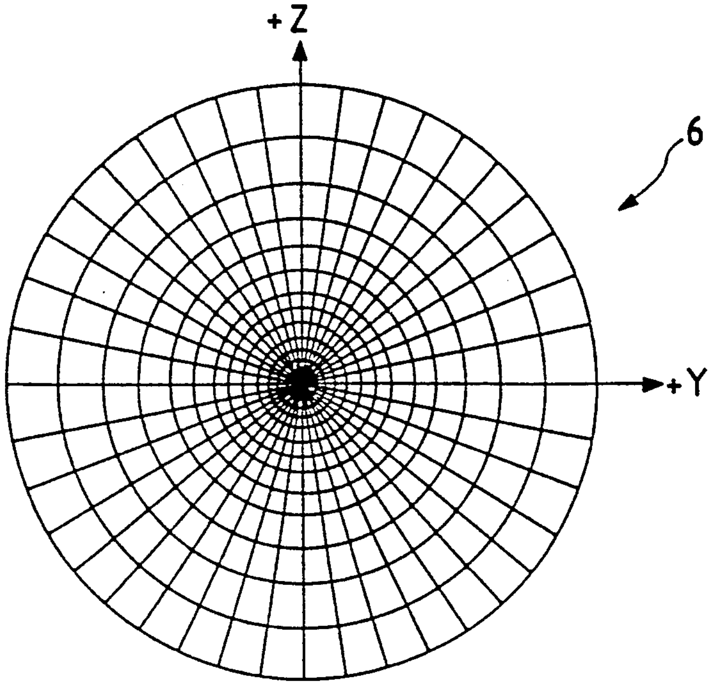
FIG. 8(*a*) is a plan view of the same bilobate hyperboloid.
Figure 8B:
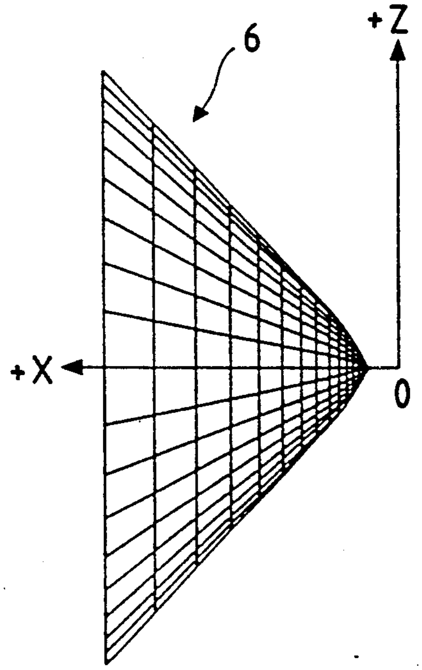

The segments composing the region 2(7) take the form of a bilobate hyperboloid, and adjacent segments are bounded by arcs of concentric circles having a common center at the origin 0, as FIG. 7 shows. The bilobate hyperboloid indicated by 6 in FIG. 7 is a rotational bilobate hyperboloid having rotational symmetry with respect to the x-axis, as shown in FIGS. 7 and 8. A cross section obtained by cutting the bilobate hyperboloid 6 through a plane at a point where x is constant takes a circular form, whereas a cross section obtained by cutting the same hyperboloid through the x-y and x-z planes has a hyperbolic form.

The segments composing the region 2(7) are designed with a bilobate hyperboloidal shape since there is no need to insure that the region 2(7) provide a particularly positive diffusing action. These segments are configured as a solid of revolution primarily because such segments are easy to arrange on the base member which, as will be described below, is in the form of a spheroid (i.e., paraboloid of revolution).

The following Table 1 correlates the respective regions of the reflecting surface 2 to the shapes of the segments that compose those regions.

TABLE 1

| Region | Shape of Segment |
|---|---|
| 2(1), 2(2), 2(3), 2(9), 2(10) | hyperbolic paraboloid |
| 2(4), 2(5), 2(6), 2(8) | elliptic paraboloid |
| 2(7) | bilobate hyperboloid |

As described above, the reflecting surface 2 is formed as an assembly of many small segments having three different shapes. These segments are fixed to the base member in the manner discussed below.

Figure 9A:
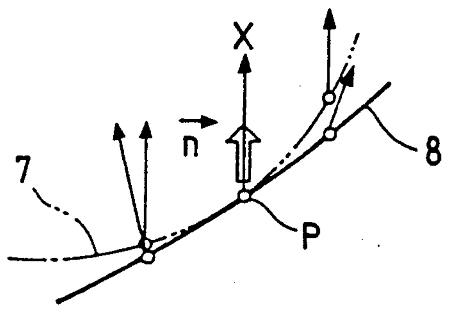
FIG. 9(*a*) is a diagram showing schematically how elliptic paraboloidal segments are arranged on a base member.
Figure 9B:
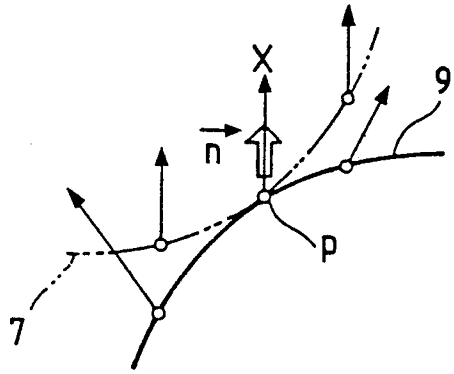
Figure 9C:
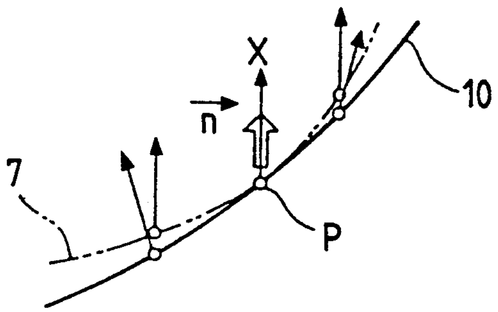

FIG. 9 is a set of diagrams showing the concept of the manner is which the individual segments are to be formed. Basically, the segments are attached partially to the base member, i.e., a surface of a spheroid. Stated more specifically, each segment is positioned in such a way the line normal to the center of the segment extends along a vector pointing in a direction parallel to the optical axis at a point on the spheroid onto which the segment is to be attached.

FIG. 9(*a*) shows the case where elliptic paraboloidal segments are to be fixed to the base member, FIG. 9(*b*) shows the case where the hyperbolic paraboloidal segments are to be fixed to the base member, and FIG. 9(*c*) shows the case where bilobate hyperboloidal segments are to be fixed to the base member. Each of the imaginary parabolas indicated by 7 in FIG. 9 represents the shape of a horizontal section of the base member (paraboloid of revolution), and vector n represents a directional vector that is parallel to the optical axis (x-axis) at an arbitrary point P on the imaginary parabola 7. Shown by 8 in FIG. 9(*a*) is a parabola that typifies the elliptic paraboloid. The center point of the parabola is brought into registry with point P in such a way that the direction of a line normal to the center (x-axis) coincides with the direction of vector n at point P. The segments are successively fixed to the base member with the start and end points of each segment being designated to satisfy the condition that continuity between that segment and an adjacent segment should be guaranteed.

Shown by 9 in FIG. 9(*b*) is a parabola that typifies hyperbolic paraboloidal segments, and shown by 10 in FIG. 9(*c*) is a hyperbola that typifies bilobate hyperboloidal segments. In either case, the segments are fixed to the base member in the same manner as described in connection with FIG. 9(*a*).

The above description of the method for arranging the segments on the base member assumes that they are located in such a way that the line normal to the center of each segment lies parallel to the optical axis (x-axis). If it is desired to provide a stronger diffusing action in the horizontal direction, the direction of the line normal to the center of each elliptic or hyperbolic paraboloidal segment should be inclined closer to the optical axis, thereby making adjustment to increase the focal length of each segment of interest. By thus acquiring the degree of freedom with respect to the center axis of each curved surface, the different reflecting regions can be provided with a desired diffusing action. An additional advantage is that the diffusing action on the left side of a luminous intensity distribution pattern can be controlled independently of the diffusing action on the right side.

Figure 10:
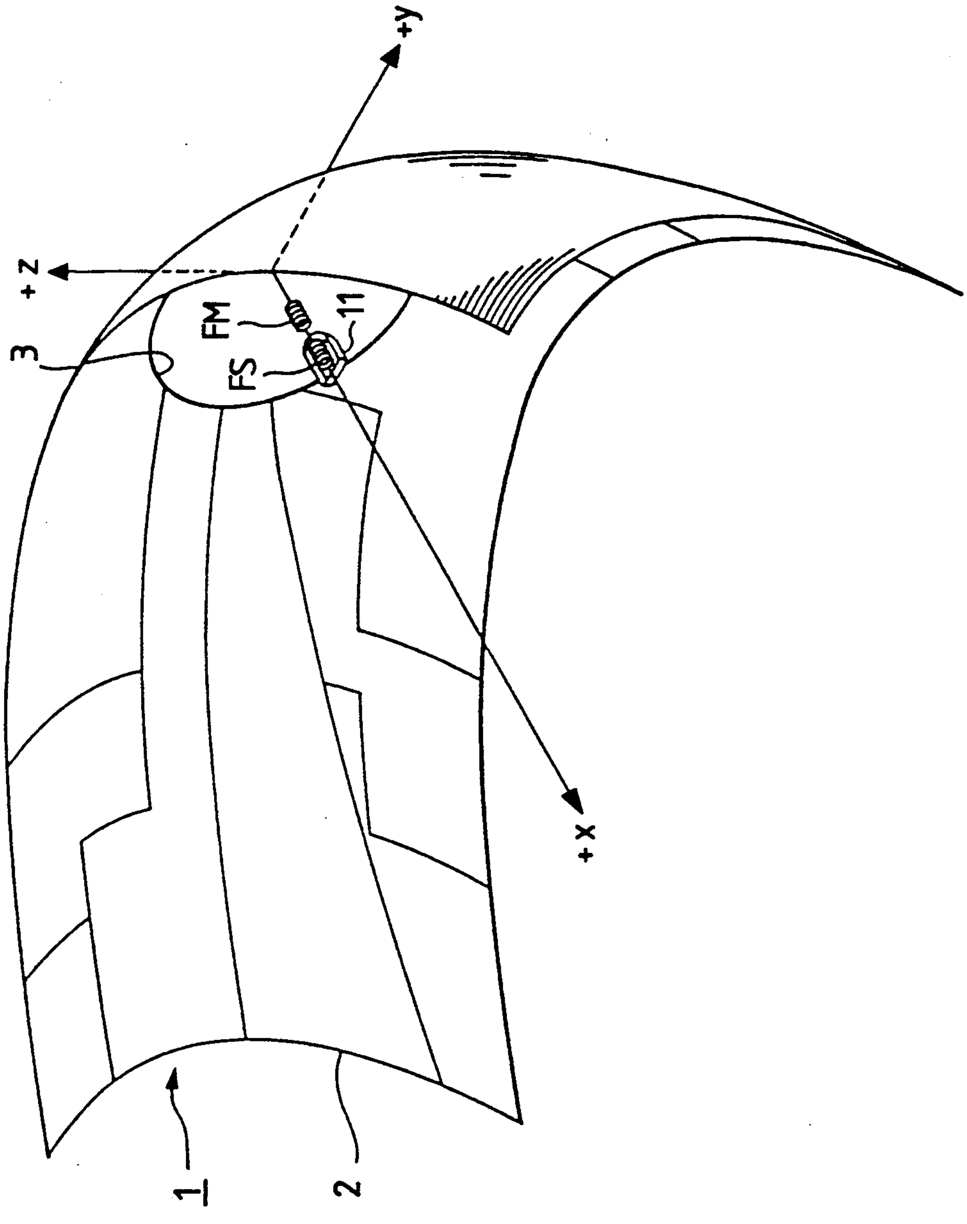
FIG. 10 is a perspective view showing a layout for the arrangement of filaments together with the reflector.

FIG. 10 is a diagram showing schematically a layout for the arrangement of filaments together with the reflector 1. Coiled filaments FM and FS are positioned in such a way that their central axis extends along the optical axis (x-axis). FS is a sub-filament, with a cut line forming a shade 11 being located beneath it. FM, the main filament, is located behind the sub-filament FS. The light source, having the filaments, of the present invention is of an $H_4$ halogen C8 type.

Figure 11A:
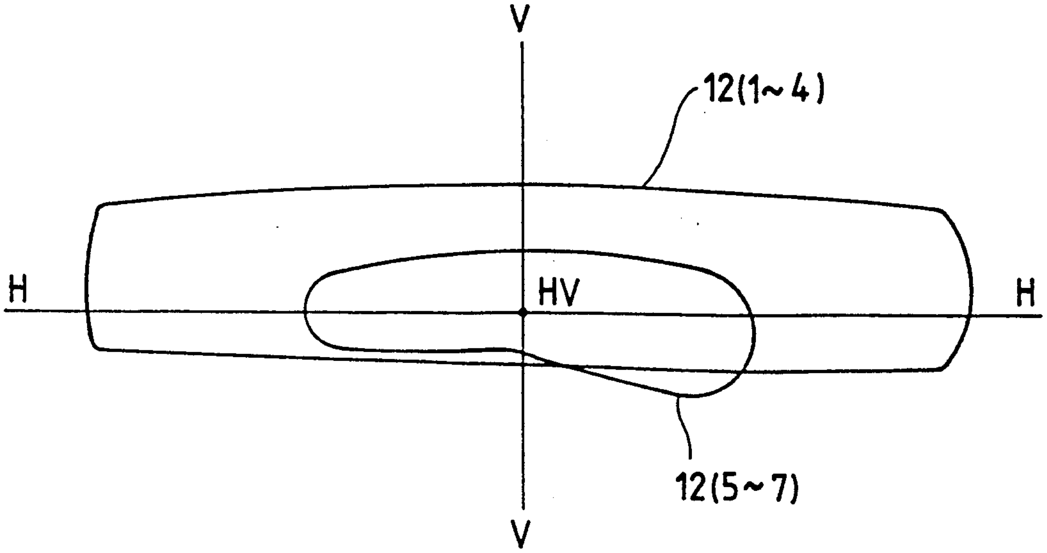
FIG. 11(*a*) is a diagram showing, in the case of a high beam, the composite luminous intensity distribution pattern obtained from regions 2(1), 2(2), 2(3) and 2(4) and the composite pattern as obtained from regions 2(5), 2(6) and 2(7)
Figure 11B:
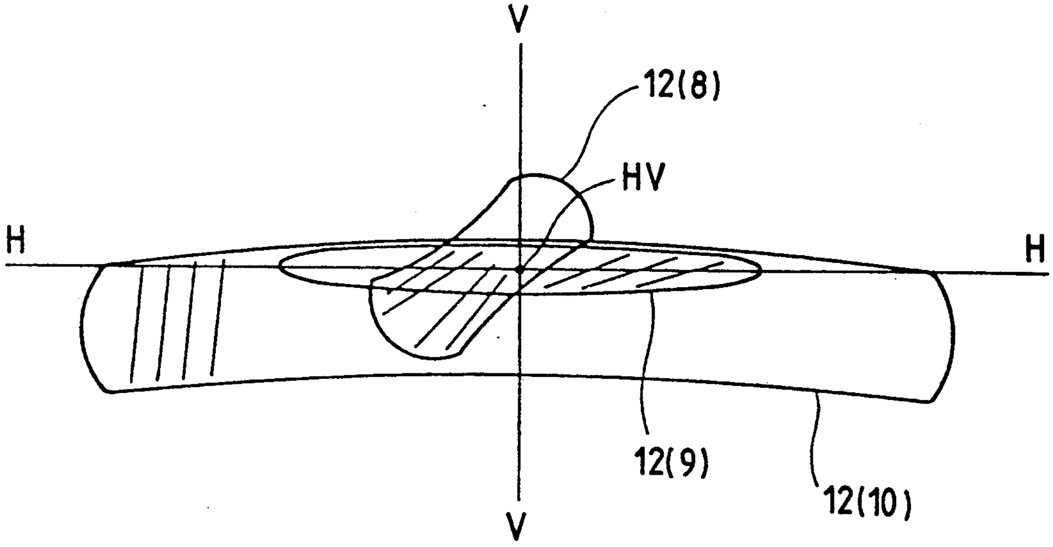
Figure 12:
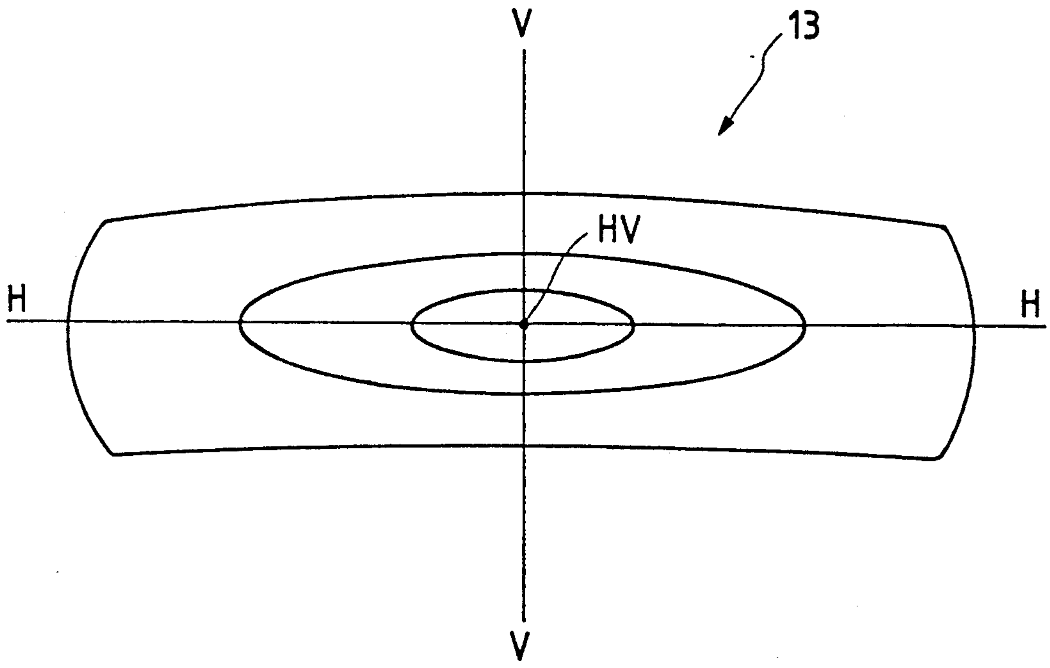
FIG. 12 is a diagram that shows schematically the brightness profile of the general luminous intensity distribution pattern of a high beam.

The reflector 1, constructed in the manner described, above provides a luminous intensity distribution pattern as shown schematically in FIGS. 11-14. FIGS. 11 and 12 illustrate the luminous intensity distribution pattern of a high beam, "H—H" denotes the horizontal line, "V—V", the vertical line, and "HV" is the point at which the two lines cross each other. The same definitions apply to FIGS. 13 and 14.

Pattern 12(1-4) in FIG. 11(*a*) represents the composite pattern as obtained from four regions 2(1), 2(2), 2(3) and 2(4); it is a rectangle elongated in the horizontal direction and is substantially symmetric with respect to the vertical line V—V, with the center being positioned slightly above the horizontal line H—H.

Pattern 12(5-7) in FIG. 11(*a*) represents the composite parts obtained from three regions 2(5), 2(6) and 2(7); it is asymmetric with respect to the vertical line V—V, with the part closer to the right end sagging somewhat.

FIG. 11(*b*) shows the three patterns that are obtained from regions 2(8), 2(9) and 2(10). The pattern 12(8) obtained from the region 2(8) is shaped like a pincushion or a dumbbell sloping upward to the right, and the pattern 12(9) obtained from the region 2(9) has an elliptic form elongated in the horizontal direction, with the center located at point HV. The pattern 12(10) obtained from the region 2(10) is spread in the horizontal direction. Although it includes the horizontal line H—H, the greater part of the latter pattern is located beneath the horizontal line while it is slightly curved, with the convex side facing up.

The fine lines in each of the patterns 12(8), 12(9) and 12(10) represent partly the direction in which the filament images are aligned (i.e., the direction in which the longitudinal center axis of each filament image extends).

FIG. 12 is a diagram that shows schematically by means of isocandela curves the brightness profile of the general luminous intensity distribution pattern 13 of a high beam that is finally obtained as the composite of the pattern shown in FIG. 11(*a*) and the pattern shown in FIG. 11(*b*). Referring to FIG. 12, the brightness is the highest in the innermost small elliptical region with the center located at point HV and it decreases towards the peripheral region.

Figure 13A:
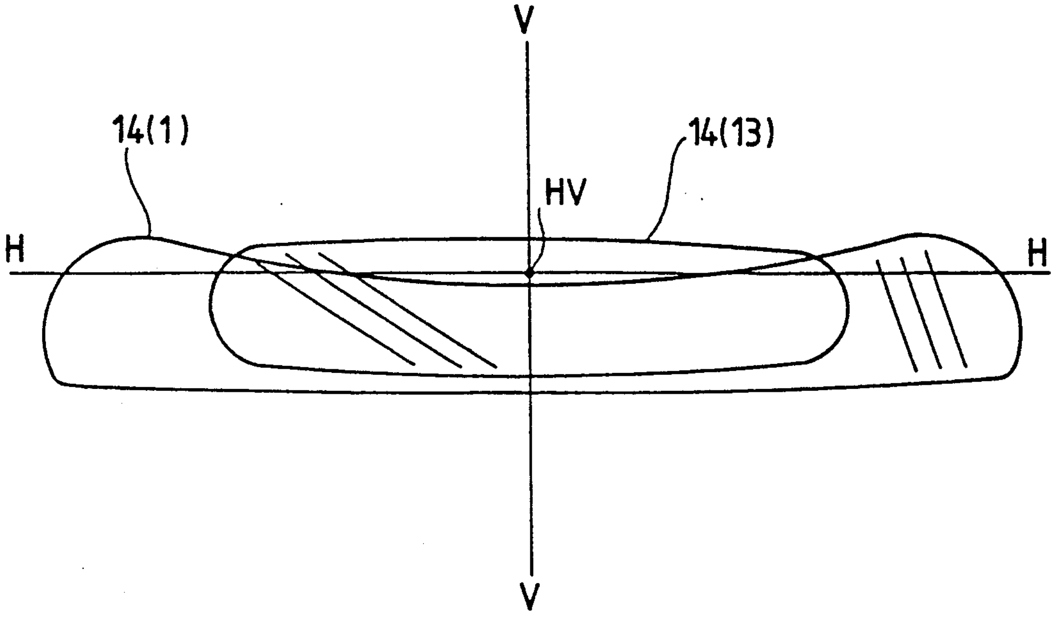
FIG. 13(*a*) is a diagram showing, in the case of a low beam, the respective patterns luminous intensity distribution patterns obtained from regions 2(1) and 2(3)
Figure 13B:
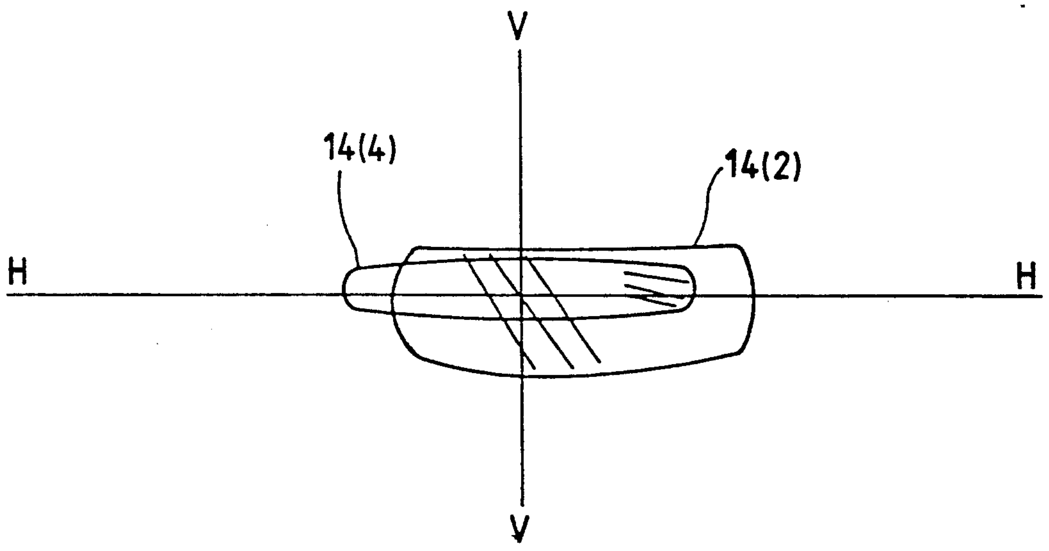
Figure 14A:
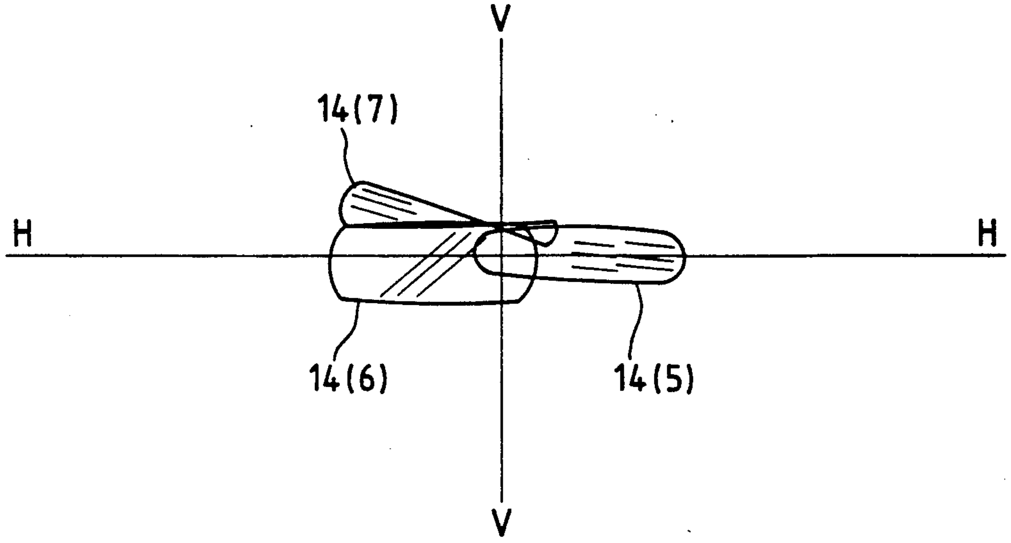
FIG. 14(*a*) is a diagram showing, also in the case of a low beam, the respective luminous intensity distribution patterns obtained from regions 2(5), 2(6) and 2(7)
Figure 14B:
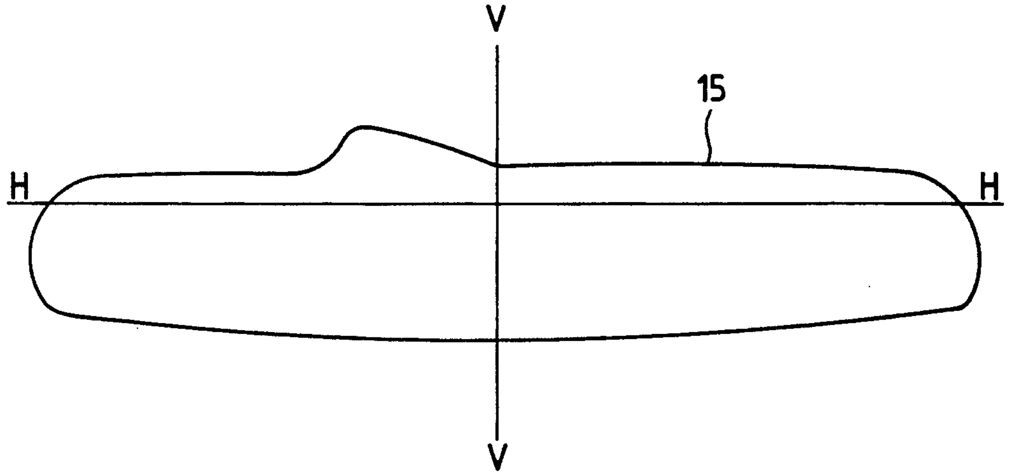

FIGS. 13 and 14 show various luminous intensity distribution patterns of a low beam. FIG. 13(*a*) shows the two patterns obtained from regions 2(1) and 2(3). Pattern 14(1) obtained from the region 2(1) is spread the most in the horizontal direction, and pattern 14(3) obtained from the region 2(3) is somewhat less broader than the pattern 14(1) and is substantially symmetrical with respect to line V—V. FIG. 13(*b*) shows the two pattern obtained from regions 2(2) and 2(4). Pattern 14(2) obtained from the region 2(2) includes both lines H—H and V—V in an area near point HV, with the center being located somewhat to the right of line V—V. Pattern 14(4) obtained from the region 2(4) is elongated in the horizontal direction and substantially symmetrical with respect to line V—V.

FIG. 14(*a*) shows the three patterns obtained from regions 2(5), 2(6) and 2(7). As shown, pattern 14(5) obtained from the region 2(5) extends along the horizontal line H—H and, although it includes point HV, it is located somewhat to the right of the vertical line V—V. Similarly, pattern 14(6) obtained from the region 2(6) extends along the horizontal line H—H and, although it includes point HV, it is located somewhat to the left of the vertical line V—V. The vertical width of the pattern 14(6) is greater than that of the pattern 14(5). Pattern 14(7) obtained from the region 2(7) is shaped like the numeral "8" lying on the side and its upper edge contributes to the formation of an inclined cut line.

The fine lines drawn with the patterns in FIGS. 13(*a*), 13(*b*) and 14(*a*) are the same as those in FIG. 11(*a*) in that they represent the manner in which the filament images are aligned. As for a low beam, regions 2(8), 2(9) and 2(10) make no contribution to the luminous intensity distribution because the light that would otherwise issue from the sub-filament FS towards these regions is actually masked by the shade 11.

The general luminous intensity distribution pattern of the low beam has the shape as shown by 15 in FIG. 14(*b*). Since the greater part of the pattern is formed by the inherent capability of the reflecting surface for controlling the luminous intensity distribution, the burden on the outer lens for distribution control is satisfactorily reduced.

As can be seen from FIGS. 11-14, the patterns obtained from the regions composed of hyperbolic paraboloidal segments contribute to the diffusion of light in luminous intensity distribution in the horizontal direction. The regions composed of elliptic paraboloidal segments contribute chiefly to the formation of the central part of the desired luminous intensity distribution pattern. Further, the region 2(7) composed of bilobate hyperboloidal segments contributes to the formation of the central part of the luminous intensity distribution pattern of the high beam, whereas the same region contributes to the formation of a cut line inclined to the horizontal line for the low beam.

As is clear from the foregoing discussion, the reflector of the present invention has the advantage that by making the reflecting surface substantially responsible for controlling the luminous intensity distribution, the burden on the outer lens for distribution control can be lessened. In addition, the reflecting regions that require an effective diffusing action to produce a wide spread of light in the horizontal direction are composed of hyperbolic paraboloidal reflecting elements, whereas the reflecting regions that contribute to the formation of the central part of the intended luminous intensity distribution pattern are composed of elliptic paraboloidal reflecting elements. This helps attain a good balance between the diffusibility of light in the horizontal direction of luminous intensity distribution pattern and the formation of its center area having a prescribed level of brightness. Further, the pattern obtained from the reflecting region composed of bilobate hyperboloidal reflecting elements chiefly contribute to the formation of the center area of the luminous intensity distribution pattern but, depending on the position of an effective light source, it may also contribute to the formation of a cut line inclined in the horizontal direction during the production of the low beam.

While several embodiments of the present invention have been described above, it should be noted here that they are merely examples that are included within the technical scope of the invention. Specifically, it should be noted that the zones of the reflecting surface over which the luminous intensity distribution is controlled are by no means limited to the ten regions described hereinabove, nor is the reference member for supporting the segments as the reflecting elements limited to a paraboloid of revolution.

What is claimed is:

1. A reflector for a headlamp comprising a reflecting surface divided into a plurality of reflecting regions, and at least one of a high-beam light source and a low beam light source positioned in such a way that a central axis thereof extends parallel to the optical axis of said reflecting surface, wherein:

(a) each of said reflecting regions is formed as an assembly of reflecting elements;

(b) each of said reflecting elements has a shape of one of a hyperbolic paraboloid, an elliptic paraboloid and a bilobate hyperboloid depending upon the region of said reflector in which the reflecting element is located, said reflecting elements being fixed to a reference member to form the entire part of said reflecting surface;

(c) ones of said reflecting regions having a high diffusing quality in the luminous intensity pattern of an output beam from said headlamp in the horizontal direction are composed of hyperbolic paraboloidal reflecting elements;

(d) ones of said reflecting regions that contribute to the formation of a central part of said luminous intensity distribution pattern are composed of elliptic paraboloidal reflecting elements; and (e) a reflecting region contributing to the formation of said central part of said luminous intensity distribution pattern for a high beam while contributing to the formation of a cut line inclined with respect to the horizontal line of said luminous intensity distribution pattern for a low beam is composed of bilobate hyperboloidal reflecting elements.

2. The headlamp of claim 1, wherein said reference member is a paraboloid of revolution.

3. The headlamp of claim 1, wherein each of said segments is positioned in such a way that a line normal to the center of the segment extends along a vector pointing in a direction parallel to the optical axis of said reflecting surface at a point on said reference member to which the segment is attached.

4. The headlamp of claim 1, wherein segments are arranged on said base member in such a way that a line normal to the center of each segment lies parallel to the optical axis of said reflecting surface.

5. The headlamp of claim 1, wherein the direction of a line normal to the center of each elliptic or hyperbolic paraboloidal segment is inclined closer to the optical axis.

6. The headlamp of claim 1, wherein said segments are arranged on said base member in such a manner that continuity between adjacent segments is maintained.

7. The headlamp of claim 1, wherein the light source is of an $H_4$ halogen C8 type.

* * * * *